(12) United States Patent
Koyama et al.

(10) Patent No.: US 11,748,645 B2
(45) Date of Patent: Sep. 5, 2023

(54) OPTIMIZATION APPARATUS AND CONTROL METHOD THEREOF

(71) Applicant: FUJITSU LIMITED, Kawasaki (JP)

(72) Inventors: Jumpei Koyama, Setagaya (JP); Noboru Yoneoka, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 1204 days.

(21) Appl. No.: 16/287,051

(22) Filed: Feb. 27, 2019

(65) Prior Publication Data
US 2019/0318258 A1 Oct. 17, 2019

(30) Foreign Application Priority Data
Apr. 16, 2018 (JP) .................................. 2018-078524

(51) Int. Cl.
*G06N 7/00* (2023.01)
*G06F 30/20* (2020.01)
*G06F 17/16* (2006.01)
*G06F 17/18* (2006.01)

(52) U.S. Cl.
CPC ............... *G06N 7/00* (2013.01); *G06F 17/16* (2013.01); *G06F 17/18* (2013.01); *G06F 30/20* (2020.01)

(58) Field of Classification Search
CPC .......... G06N 7/00; G06F 30/20; G06F 17/16; G06F 17/18
See application file for complete search history.

(56) References Cited

U.S. PATENT DOCUMENTS 4,969,097 A * 11/1990 Levin ...................... G06F 3/023
400/98
5,021,988 A * 6/1991 Mashiko ................ G06N 3/065
706/30
(Continued)

FOREIGN PATENT DOCUMENTS

JP 5-282159 A 10/1993
JP 11-238073 A 8/1999
(Continued)

OTHER PUBLICATIONS

Japanese Platform for Patent Information English abstract for Japanese Patent Publication No. 2017-138760, published Aug. 10, 2017.
(Continued)

*Primary Examiner* — Nicholas Augustine
(74) *Attorney, Agent, or Firm* — STAAS & HALSEY LLP

(57) ABSTRACT

An optimization apparatus includes a compression unit, a storage unit, a decoding unit, and an annealing unit. The compression unit outputs compressed coefficient data in which a coefficient matrix including coupling coefficients, each of which indicates a coupling strength between bits of an Ising model obtained by converting a calculation target problem, is compressed on the basis of a symmetry property or a pattern property of the coefficient matrix. The storage unit holds the compressed coefficient data outputted by the compression unit. The decoding unit decodes the compressed coefficient data stored in the storage unit to obtain the coupling coefficients. The annealing unit performs a simulated annealing operation by using the coupling coefficients obtained by the decoding unit.

10 Claims, 10 Drawing Sheets

(56) References Cited

U.S. PATENT DOCUMENTS

| | | | | |
|---|---|---|---|---|
| 5,724,457 | A * | 3/1998 | Fukushima | G06V 30/32 |
| | | | | 382/187 |
| 5,805,159 | A * | 9/1998 | Bertram | G06F 3/0237 |
| | | | | 345/169 |
| 5,864,340 | A * | 1/1999 | Bertram | G06F 40/274 |
| | | | | 715/780 |
| 5,959,629 | A * | 9/1999 | Masui | G06F 3/04886 |
| | | | | 715/708 |
| 6,002,390 | A * | 12/1999 | Masui | G06F 3/04886 |
| | | | | 715/810 |
| 6,321,158 | B1 * | 11/2001 | DeLorme | G06Q 10/047 |
| | | | | 701/426 |
| 6,337,698 | B1 * | 1/2002 | Keely, Jr. | G06F 3/0483 |
| | | | | 715/779 |
| 6,675,169 | B1 * | 1/2004 | Bennett | G06F 16/9024 |
| 7,171,353 | B2 * | 1/2007 | Trower, II | G06F 3/0237 |
| | | | | 715/256 |
| 7,194,404 | B1 * | 3/2007 | Babst | G06F 40/274 |
| | | | | 704/10 |
| 7,387,457 | B2 * | 6/2008 | Jawerth | G06F 1/1622 |
| | | | | 400/489 |
| 7,447,627 | B2 * | 11/2008 | Jessee | G06F 40/242 |
| | | | | 715/255 |
| 7,689,684 | B2 * | 3/2010 | Donoho | H04L 67/564 |
| | | | | 709/224 |
| 8,015,482 | B2 * | 9/2011 | Simova | G06F 40/169 |
| | | | | 715/230 |
| 2002/0015042 | A1 * | 2/2002 | Robotham | G06F 3/1454 |
| | | | | 345/581 |
| 2002/0024506 | A1 * | 2/2002 | Flack | G06F 1/163 |
| | | | | 345/169 |
| 2002/0052900 | A1 * | 5/2002 | Freeman | G06F 3/0237 |
| | | | | 715/262 |
| 2002/0156864 | A1 * | 10/2002 | Kniest | H04L 67/04 |
| | | | | 709/227 |
| 2004/0239681 | A1 * | 12/2004 | Robotham | G06F 3/14 |
| | | | | 345/581 |
| 2005/0012723 | A1 * | 1/2005 | Pallakoff | G06F 1/1656 |
| | | | | 345/173 |
| 2005/0195221 | A1 * | 9/2005 | Berger | G06F 16/9577 |
| | | | | 345/660 |
| 2005/0223308 | A1 * | 10/2005 | Gunn | G06F 3/04886 |
| | | | | 707/999.1 |
| 2005/0283364 | A1 * | 12/2005 | Longe | G10L 15/32 |
| | | | | 704/E15.041 |
| 2006/0020904 | A1 * | 1/2006 | Aaltonen | G06F 3/0482 |
| | | | | 715/850 |
| 2006/0026521 | A1 * | 2/2006 | Hotelling | G06F 3/0488 |
| | | | | 715/702 |
| 2006/0026535 | A1 * | 2/2006 | Hotelling | G06F 3/0488 |
| | | | | 715/863 |
| 2006/0026536 | A1 * | 2/2006 | Hotelling | G06F 3/04883 |
| | | | | 715/863 |
| 2006/0088356 | A1 * | 4/2006 | Jawerth | G06F 3/0237 |
| | | | | 400/472 |
| 2006/0095842 | A1 * | 5/2006 | Lehto | G06F 40/242 |
| | | | | 715/259 |
| 2006/0101005 | A1 * | 5/2006 | Yang | G06F 16/9537 |
| 2006/0161870 | A1 * | 7/2006 | Hotelling | G06F 3/0412 |
| | | | | 715/863 |
| 2006/0161871 | A1 * | 7/2006 | Hotelling | G06F 3/0485 |
| | | | | 715/862 |
| 2006/0265648 | A1 * | 11/2006 | Rainisto | G06F 3/0237 |
| | | | | 715/256 |
| 2006/0274051 | A1 * | 12/2006 | Longe | G06F 40/232 |
| | | | | 345/173 |
| 2007/0061704 | A1 * | 3/2007 | Simova | G06F 40/169 |
| | | | | 715/256 |
| 2007/0263007 | A1 * | 11/2007 | Robotham | G06F 3/1454 |
| | | | | 345/581 |
| 2017/0220924 | A1 | 8/2017 | Danjo et al. | |
| 2017/0364477 | A1 | 12/2017 | Thach et al. | |
| 2018/0101784 | A1 * | 4/2018 | Rolfe | G06F 15/80 |
| 2018/0276557 | A1 * | 9/2018 | Tanamoto | G06N 5/01 |

FOREIGN PATENT DOCUMENTS

| | | |
|---|---|---|
| JP | 2017-138760 | 8/2017 |
| JP | 2017-224227 A | 12/2017 |

OTHER PUBLICATIONS

Japanese Office Action dated Dec. 14, 2021 from Japanese Application No. 2018-078524.

* cited by examiner

FIG. 6

| | STORAGE AREAS (LINES) |
|---|---|
| SIZE OF COEFFICIENT MATRIX, KINDS OF SUB-BLOCKS, ETC. | L1 |
| COUPLING COEFFICIENTS IN SUB-BLOCK A | L2 |
| COUPLING COEFFICIENTS IN SUB-BLOCK B | L3 |
| COUPLING COEFFICIENTS IN SUB-BLOCK C | L4 |
| BIT PATTERN IN 1st ROW OF COEFFICIENT MATRIX | L5 |
| BIT PATTERN IN 2nd ROW OF COEFFICIENT MATRIX | L6 |
| BIT PATTERN IN 3rd ROW OF COEFFICIENT MATRIX | L7 |
| ⋮ | |
| BIT PATTERN IN 1,024th ROW OF COEFFICIENT MATRIX | L1028 |

FIG. 7

OPTIMIZATION APPARATUS AND CONTROL METHOD THEREOF

CROSS-REFERENCE TO RELATED APPLICATION

This application is based upon and claims the benefit of priority of the prior Japanese Patent Application No. 2018-078524, filed on Apr. 16, 2018, the entire contents of which are incorporated herein by reference.

FIELD

The embodiments discussed herein relate to an optimization apparatus and a control method thereof.

BACKGROUND

Neumann computers are not very suitable for solving multivariable optimization problems. However, to solve these problems, there is a method using an optimization apparatus (which could also be referred to as an Ising machine or a Boltzmann machine) that uses an Ising energy function. The optimization apparatus performs calculation by replacing a calculation target problem with an Ising model, which is a model representing the behavior of magnetic spins.

The optimization apparatus is modeled by using a neural network, for example. In this case, an individual unit (bit) included in the optimization apparatus functions as a neuron that outputs 0 or 1. More specifically, a unit (bit) outputs 0 or 1 on the basis of the states of the other bits and the coupling coefficients (also referred to as weight coefficients) indicating the coupling strengths with the other bits. For example, the optimization apparatus uses a stochastic search method using simulated annealing and obtains, as a solution, a combination of bits that achieves a minimum value of an energy function as described above (also referred to as a cost function, an objective function, etc.). There has conventionally been proposed an optimization apparatus that performs simulated annealing by using hardware components, namely, by using logic circuits such as adders and comparators. See, for example, Japanese Laid-open Patent Publication No. 2017-138760.

There are various methods for storing the coupling coefficients. For example, the coupling coefficients may be stored in a memory provided outside the above optimization apparatus realized by using hardware components. However, reading the coupling coefficients from an external memory could take much time. Thus, as an alternative, the coupling coefficients may be stored in an internal memory of the optimization apparatus. In this way, the coupling coefficients are accessed faster than those stored in an external memory.

However, the number of coupling coefficients increases as the problem scale increases. Thus, use of an internal memory is problematic in that all the coupling coefficients could not be stored in the internal memory mounted as a hardware component of the optimization apparatus. For example, when the bit number of the Ising model is 1,024 and when a single coupling coefficient is represented by 32 bits, the bit number of all the coupling coefficients is about 33 megabits (Mbit). Current hardware on-chip memories have a storage capacity of about several dozen megabits at most. Thus, considering that there is also data that needs to be stored other than the coupling coefficients, it is difficult to handle a problem whose scale is larger than the above scale.

SUMMARY

According to one aspect, there is provided an optimization apparatus including: a compression unit configured to output compressed coefficient data in which a coefficient matrix including coupling coefficients, each of which indicates a coupling strength between bits of an Ising model obtained by converting a calculation target problem, is compressed based on a symmetry property or a pattern property of the coefficient matrix; a storage unit configured to hold the compressed coefficient data outputted by the compression unit; a decoding unit configured to decode the compressed coefficient data stored in the storage unit to obtain the coupling coefficients; and an annealing unit configured to perform a simulated annealing operation by using the coupling coefficients obtained by the decoding unit.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 illustrates an example of a coefficient matrix having a pattern property;

FIG. 7 illustrates an example of compressed coefficient data stored;

DESCRIPTION OF EMBODIMENTS

Hereinafter, several embodiments will be described with reference to the accompanying drawings.

First Embodiment

The following optimization apparatus calculates an optimization problem such as a traveling salesman problem by searching for the ground state of an Ising model (the values of the individual bits when an Ising energy function represents a minimum value). An Ising energy function E(x) is defined by the following formula (1), for example.

$$E(x) = -\sum_{(i,j)} W_{ij} x_i x_j - \sum_i b_i x_i \qquad (1)$$

The first term on the right side in formula (1) represents all the combinations of two bits selectable from all the bits (all the neurons) without missing or redundantly counting any bit. More specifically, the first term represents the sum of products, each of which is a result of multiplication of one bit value (0 or 1), another bit value (0 or 1), and a corresponding coupling coefficient. In formula (1), $x_i$ denotes the value of the i-th bit, $x_j$ denotes the value of the j-th bit, $W_{ij}$ denotes a coupling coefficient that indicates the coupling strength between the i-th and j-th bits. In formula (1), $W_{ii}$=0. In many cases, $W_{ij}$=$W_{ji}$ (namely, in many cases, a coefficient matrix of coupling coefficients is a symmetric matrix).

The second term on the right side in formula (1) represents the sum of products, each of which is a result of multiplication of the bias coefficient of an individual bit and the corresponding bit value. In formula (1), $b_i$ denotes the bias coefficient of the i-th bit.

For example, an energy change $\Delta E_i$ associated with a spin flip (change of the value) of the i-th bit is expressed by the following formula (2).

$$\Delta E_i = (2x_i - 1) \cdot \left( \sum_j W_{ij} x_j + b_i \right) \qquad (2)$$

In formula (2), when the value $x_i$ of the i-th bit is 1, $2x_i$−1 is 1. When the value $x_i$ is 0, $2x_i$−1 is −1. In addition, $h_i$ in the following formula (3) is called a local field. The energy change $\Delta E_i$ is obtained by multiplying the local field $h_i$ by the sign (+1 or −1) based on the value $x_i$.

$$h_i = \sum_j W_{ij} x_j + b_i \qquad (3)$$

Figure 1:
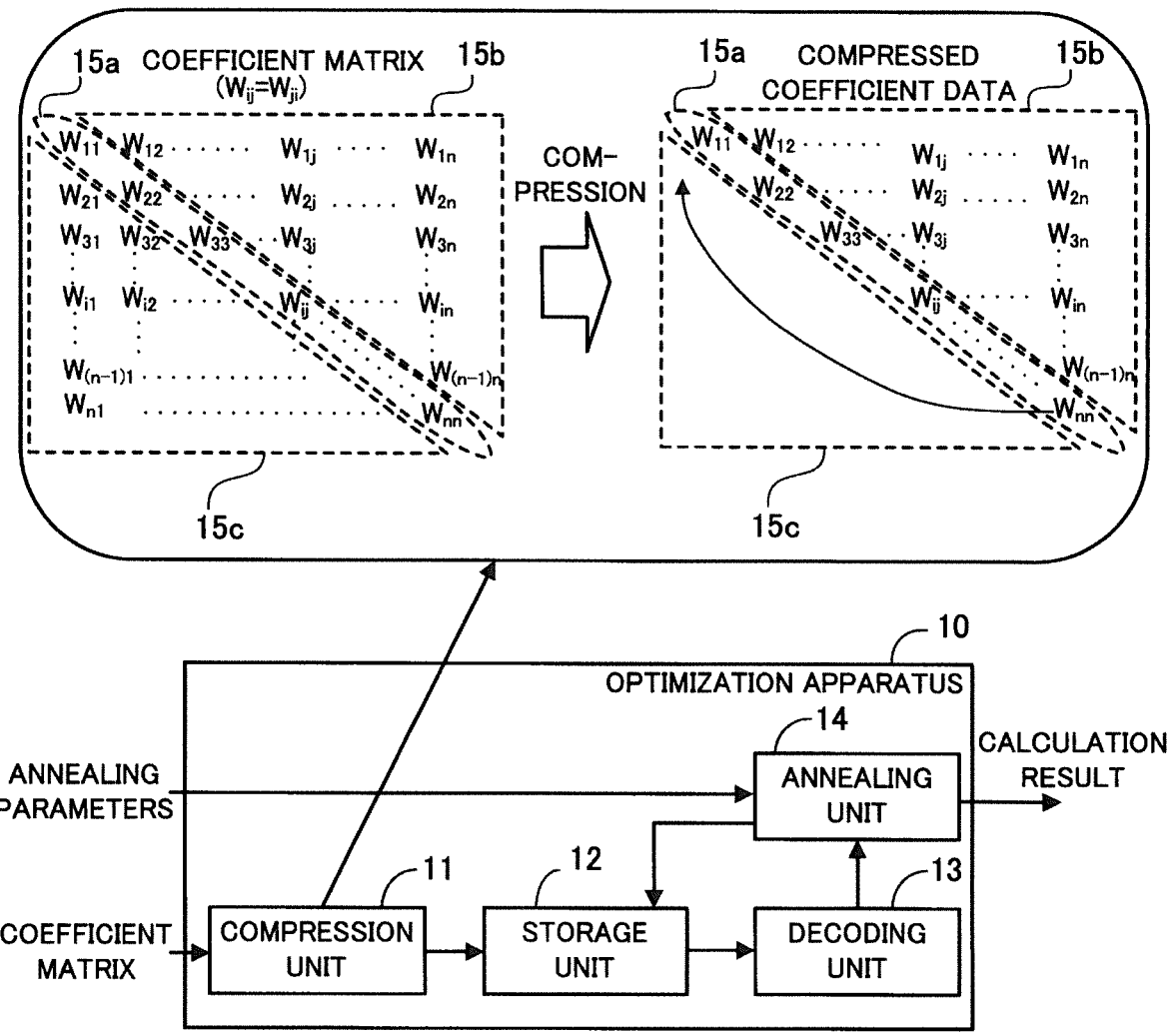
FIG. 1 illustrates an example of an optimization apparatus and a control method thereof according to a first embodiment.

FIG. 1 illustrates an example of an optimization apparatus 10 and a control method thereof according to a first embodiment.

The optimization apparatus 10 according to the first embodiment includes a compression unit 11, a storage unit 12, a decoding unit 13, and an annealing unit 14.

The compression unit 11 outputs compressed coefficient data in which a coefficient matrix including coupling coefficients, each of which indicates a coupling strength between bits of an Ising model obtained by converting a calculation target problem, is compressed on the basis of a symmetry property or a pattern property of the coefficient matrix. For example, as described above, when $W_{ij}$=$W_{ji}$, namely, when the coefficient matrix is a symmetric matrix, the compression unit 11 outputs compressed matrix data in which the coefficient matrix is compressed on the basis of the symmetry property of the coefficient matrix.

FIG. 1 illustrates an example of how a coefficient matrix of an Ising model including n bits is compressed. This coefficient matrix, which is a symmetric matrix, includes a diagonal component 15a and symmetric components 15b and 15c sandwiching the diagonal component 15a. Since $W_{ij}$=$W_{ji}$, one of the symmetric components 15b and 15c is reproducible from the other one of the symmetric components 15b and 15c. Thus, the compression unit 11 outputs compressed coefficient data including the diagonal component 15a and one of the symmetric components 15b and 15c. In the example in FIG. 1, the compression unit 11 outputs compressed coefficient data including the diagonal component 15a and the symmetric component 15b.

An example of how a coefficient matrix is compressed on the basis of a pattern property of the coefficient matrix will be described below (see a third embodiment).

The storage unit 12 holds the compressed coefficient data outputted by the compression unit 11.

When the annealing unit 14 calculates the local field $h_i$ expressed by formula (3) for each bit, coupling coefficients for each row in the coefficient matrix are used.

When the coupling coefficients included in the compressed coefficient data as illustrated in FIG. 1 are stored per row (per coupling coefficient set used for calculating a single bit) in a storage area (per line) in the storage unit 12, the storage areas allocated to the symmetric component 15c that is not included in the compressed coefficient data are wasted. Thus, the compression unit 11 stores coupling coefficients included in the diagonal component 15a or the symmetric component 15b in the storage areas allocated to the symmetric component 15c in the storage unit 12 in accordance with a predetermined memory arrangement rule. In this way, a smaller storage area is used for storing the compressed coefficient data.

The decoding unit 13 decodes the compressed coefficient data stored in the storage unit 12 to obtain the coupling coefficients. For example, as illustrated in FIG. 1, when the coefficient matrix is compressed on the basis of a symmetry property, the decoding unit 13 decodes the symmetric component 15b included in the compressed coefficient data stored in the storage unit 12 to obtain the symmetric component 15c. For example, when the annealing unit 14 transmits a request for reading a row including the coupling coefficient $W_{i2}$, the decoding unit 13 uses the coupling coefficients in the column including the coupling coefficient $W_{2i}$ in the compressed coefficient data to obtain the coupling coefficients in the row including the coupling coefficient $W_{i2}$ that are not included in the compressed coefficient data.

In addition, when the annealing unit 14 transmits a request for reading a coupling coefficient in the diagonal component 15a or the symmetric component 15b arranged in a storage area allocated to the symmetric component 15c, the decoding unit 13 reads the coupling coefficient from the storage unit 12 on the basis of the predetermined memory arrangement rule.

A decoding example applied to a case where a coefficient matrix is compressed on the basis of a pattern property will be described below.

The compression unit 11 or the decoding unit 13 as described above is realized, for example, by an electronic circuit designed for specific use, such as an application-specific integrated circuit (ASIC) or a field-programmable gate array (FPGA). In addition, the compression unit 11 or the decoding unit 13 may be a processor such as a central processing unit (CPU) or a digital signal processor (DSP). When the compression unit 11 or the decoding unit 13 is a processor, the corresponding processing described above is realized by causing the processor to execute the corresponding program stored in the storage unit 12, for example.

The storage unit 12 is, for example, a volatile memory such as a static random access memory (SRAM) or a non-volatile memory such as a flash memory or an electrically erasable programmable read-only memory (EEPROM).

The annealing unit 14 performs a simulated annealing operation by using the coupling coefficients obtained by the decoding unit 13 and searches for the ground state of the corresponding Ising model. The annealing unit 14 performs a simulated annealing operation on the basis of annealing parameters.

The annealing parameters are, for example, an initial temperature, a final temperature, and a cooling schedule (a cooling rate, etc.) used when a temperature is dropped by the simulated annealing operation, the number of times arithmetic processing is repeated, bias coefficients, and initial bit values. In the simulated annealing operation, the temperature is represented by the width of a noise. A higher temperature corresponds to a wider noise width. The noise is generated by a random number generator (for example, linear feedback shift registers (LFSRs)).

For example, the annealing unit 14 transmits a request for reading a coupling coefficient $W_{ij}$ used for calculating the local field $h_i$ represented by formula (3) to the storage unit 12 by specifying a read address. The annealing unit 14 stores the coupling coefficient $W_{ij}$ obtained by the decoding unit 13 in a memory or a register (not illustrated) in the annealing unit 14. Next, the annealing unit 14 calculates the local field $h_i$ on the basis of the coupling coefficient $W_{ij}$, the bias coefficient $b_i$, and the value $x_i$. Next, the annealing unit 14 adds a noise (a random number) to the local field $h_i$, performs comparison with a threshold, and determines whether to update the value of the i-th bit.

The annealing unit 14 performs the arithmetic processing as described above on each bit. The annealing unit 14 could determine that, of all the bits, a plurality of bits are updatable. In this case, to avoid deterioration of the convergence, the annealing unit 14 selects one of the plurality of updatable bits by using a random number and updates the value of the selected bit. The annealing unit 14 may perform the processing about the bits in a parallel manner. In this case, first, the annealing unit 14 transmits a request for reading all the coupling coefficients to the storage unit 12.

The annealing unit 14 repeats the arithmetic processing as described above a predetermined number of times, for example. On the basis of the cooling schedule, the annealing unit 14 drops the temperature (the noise width) each time the annealing unit 14 repeats the arithmetic processing a certain number of times less than the predetermined number of times, for example. The annealing unit 14 outputs the values of the individual bits, which the annealing unit 14 has obtained after repeating the arithmetic processing the predetermined number of times, as a solution (a calculation result) to the problem. The annealing unit 14 may calculate the value of the energy function E(x) represented by formula (1) after each repetitive processing (the value will simply be referred to as an energy) and may hold a minimum energy and the values of the individual bits corresponding to the minimum energy. In this case, for example, after repeating the processing the predetermined number of times, the annealing unit 14 outputs the values of the individual bits corresponding to a minimum energy as a calculation result.

The annealing unit 14 may perform the arithmetic processing in accordance with an exchange Monte Carlo method, which is a simulated annealing method in a broad sense. In this case, the annealing unit 14 includes, for example, a plurality of units (replicas) for performing arithmetic processing about all the bits. Each unit is given a different temperature. Processing for causing units, to which adjacent temperatures are allocated, to exchange their respective temperatures or states (the values of the individual bits) with each other is repeated on the basis of a predetermined exchange probability based on the energies or temperatures of the respective units. For example, the unit state that indicates a minimum energy after the processing is repeated a predetermined number of times is outputted as a solution.

The annealing unit 14 as described above is realized by, for example, registers or memories holding the coupling coefficients, the bias coefficients, and the individual bit values, product-sum operation circuits, random number generators (LFSRs, for example), logic circuits such as comparators and selectors, and a control circuit that specifies read addresses.

The annealing parameters and the coefficient matrix are supplied from an apparatus (for example, a computer) outside the optimization apparatus 10. For example, this external apparatus converts the calculation target problem into an Ising model. The calculation result is supplied from the optimization apparatus 10 to the external apparatus and is displayed by, for example, a display device such as a display.

Hereinafter, an example of an operation of the optimization apparatus 10 according to the first embodiment will be described.

When the compression unit 11 receives a coefficient matrix read from, for example, a memory of a computer not illustrated, the compression unit 11 outputs compressed coefficient data in which the coefficient matrix is compressed on the basis of a symmetry property or a pattern property of the coefficient matrix. The compressed coefficient data outputted by the compression unit 11 is stored in the storage unit 12.

First, the annealing unit 14 transmits a request for reading, for example, coupling coefficients $W_{11}$ to $W_{1n}$ indicating coupling strengths of the first bit with respect to the other bits by specifying a read address to the storage unit 12. Accordingly, the compressed coefficient data corresponding to the read address is read from the storage unit 12 by the decoding unit 13. As illustrated in FIG. 1, when the coefficient matrix is compressed on the basis of a symmetry property, since the coupling coefficients $W_{11}$ to Win indicating coupling strengths of the first bit with respect to the other bits are included in the compressed coefficient data, the decoding unit 13 supplies the coupling coefficients $W_{11}$ to $W_{1n}$ to the annealing unit 14.

As a result, the annealing unit 14 performs the above processing (the local field calculation processing, the value update determination processing, etc.) on the first bit by using the coupling coefficients $W_{11}$ to $W_{1n}$.

Next, the annealing unit 14 transmits a request for reading coupling coefficients $W_{21}$ to $W_{2n}$ indicating the coupling strengths of the second bit with respect to the other bits by specifying a read address. Accordingly, the compressed coefficient data corresponding to the read address is read from the storage unit 12 to the decoding unit 13. As illustrated in FIG. 1, when the coefficient matrix is compressed on the basis of a symmetry property, the coupling coefficient $W_{21}$ indicating the coupling strength between the second bit and the first bit is not included in the compressed coefficient data. Thus, the decoding unit 13 obtains the coupling coefficient $W_{21}$ by reading the coupling coefficient $W_{12}$, which is the same value as that of the coupling coefficient $W_{21}$ and is included in the compressed coefficient data stored in the storage unit 12.

As a result, the annealing unit 14 performs the above processing on the second bit by using the coupling coefficients $W_{21}$ to $W_{2n}$.

The same processing is performed on the individual bits. The annealing unit 14 could determine that, of all the bits, a plurality of bits are updatable. In this case, the annealing unit 14 selects one of the plurality of updatable bits by using a random number and updates the value of the selected bit. The annealing unit 14 repeats the arithmetic processing as described above a predetermined number of times, for example. On the basis of the cooling schedule, the annealing unit 14 drops the temperature each time the annealing unit 14 repeats the arithmetic processing a certain number of times less than the predetermined number of times, for example. Next, the annealing unit 14 outputs the values of the individual bits that the annealing unit 14 has obtained after repeating the arithmetic processing the predetermined number of times as a solution (a calculation result) to the problem.

With this optimization apparatus 10 according to the first embodiment, since a coefficient matrix is compressed on the basis of a symmetry property or a pattern property of the coefficient matrix and is stored in the storage unit 12, the storage unit 12 needs a smaller storage capacity, compared with the problem scale. Namely, a large-scale problem is calculated by using a small amount of memory.

When a coefficient matrix has both a symmetry property and a pattern property, the coefficient matrix may be compressed on the basis of the pattern property. This is because the compression based on the pattern property achieves a higher compression ratio than that achieved by the compression based on the symmetry property, as will be described below.

Second Embodiment

Figure 2:
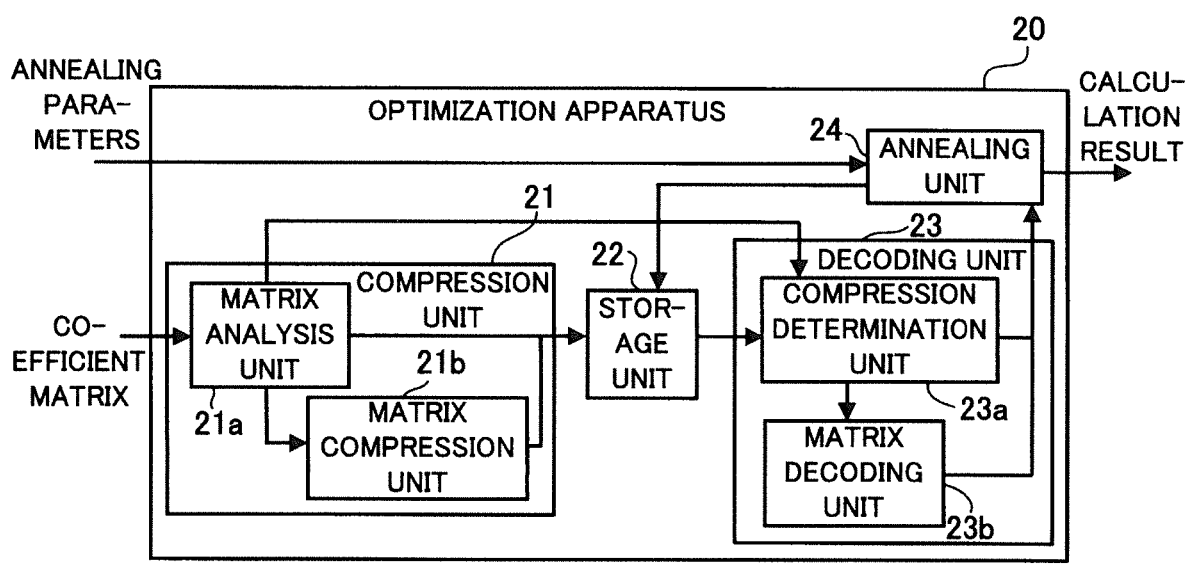
FIG. 2 illustrates an example of an optimization apparatus according to a second embodiment.

FIG. 2 illustrates an example of an optimization apparatus 20 according to a second embodiment.

The optimization apparatus 20 according to the second embodiment includes a compression unit 21, a storage unit 22, a decoding unit 23, and an annealing unit 24.

The compression unit 21 includes a matrix analysis unit 21a and a matrix compression unit 21b.

The matrix analysis unit 21a receives a coefficient matrix, analyzes the received coefficient matrix, and determines whether the coefficient matrix has a symmetry property. For example, the matrix analysis unit 21a determines whether all the coupling coefficients included in the coefficient matrix satisfy the relationship $W_{ij}=W_{ji}$. If all the coupling coefficients satisfy the relationship $W_{ij}=W_{ji}$, the matrix analysis unit 21a determines that the coefficient matrix has a symmetry property. If there are coupling coefficients that do not satisfy the relationship $W_{ij}=W_{ji}$, the matrix analysis unit 21a determines that the coefficient matrix does not have a symmetry property.

If the matrix analysis unit 21a determines that the coefficient matrix has a symmetry property, the matrix analysis unit 21a transmits the coefficient matrix to the matrix compression unit 21b. In contrast, if the matrix analysis unit 21a determines that the coefficient matrix does not have a symmetry property, the matrix analysis unit 21a stores the coefficient matrix in the storage unit 22. If the matrix analysis unit 21a determines that the coefficient matrix has a symmetry property, the matrix analysis unit 21a transmits a signal indicating compression of the coefficient matrix (for example, a signal having a value 0 or 1 (hereinafter referred to as a flag)) to the decoding unit 23.

The matrix compression unit 21b outputs compressed coefficient data in which the coefficient matrix is compressed on the basis of the symmetry property of the coefficient matrix. For example, as illustrated in FIG. 1, the matrix compression unit 21b outputs the compressed coefficient data including the diagonal component 15a and the symmetric component 15b. In addition, the matrix compression unit 21b stores coupling coefficients included in the diagonal component 15a or the symmetric component 15b in the storage areas allocated to the symmetric component 15c in the storage unit 22 in accordance with a predetermined memory arrangement rule. In this way, a smaller storage area is used for storing the compressed coefficient data.

Figure 3:
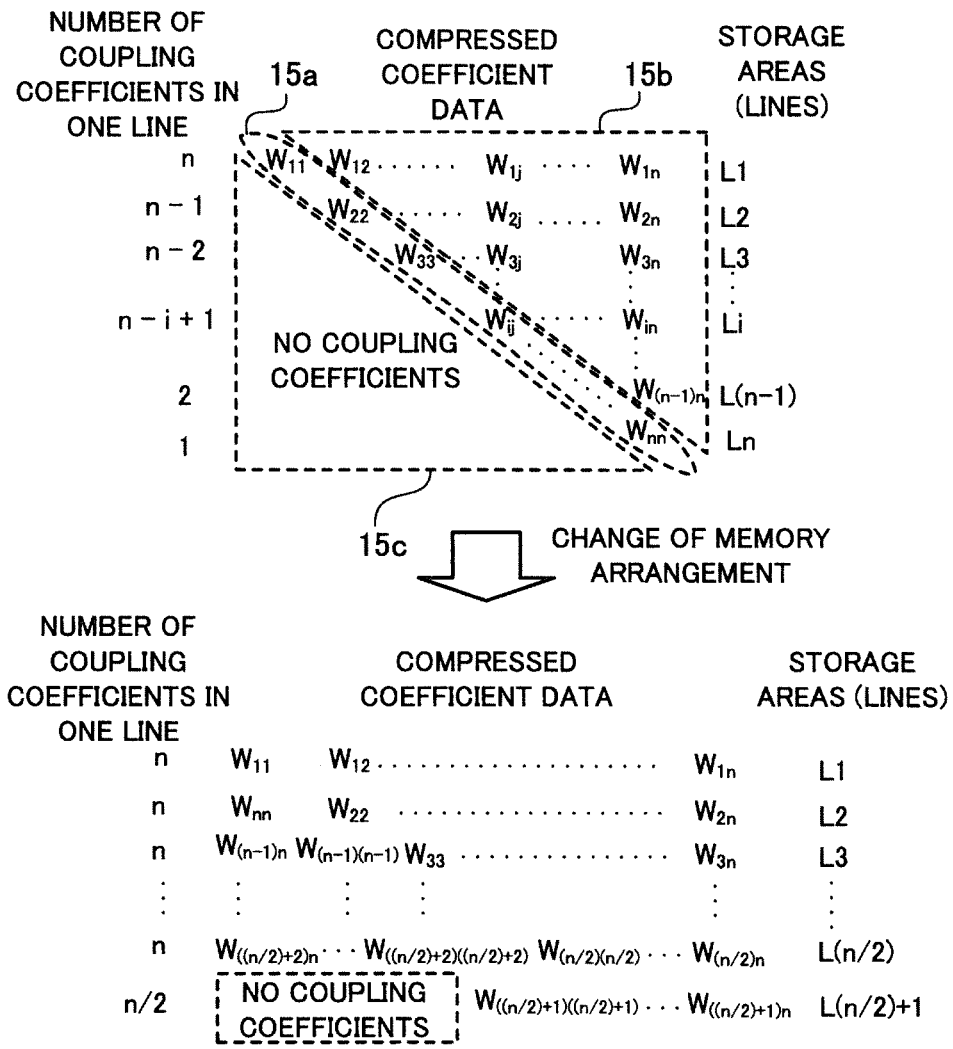
FIG. 3 illustrates an example of arrangement of coupling coefficients in a storage unit.

FIG. 3 illustrates an example of arrangement of coupling coefficients in a storage unit.

When the coupling coefficients included in the compressed coefficient data are stored per row in an individual one of the storage areas L1 to Ln (per line) in the storage unit 22, the storage areas allocated to the symmetric component 15c that is not included in the compressed coefficient data are wasted. For example, while n coupling coefficients are stored in the storage area L1, only one coupling coefficient is stored in the storage area Ln.

Thus, the matrix compression unit 21b stores coupling coefficients included in the diagonal component 15a or the symmetric component 15b in the storage areas allocated to the symmetric component 15c in the storage unit 22 in accordance with the predetermined memory arrangement rule. In the example in FIG. 3, the coupling coefficient $W_{nn}$ is stored as the first coupling coefficient in the storage area L2. In this way, n coupling coefficients are stored in each of the storage areas L1 to L(n/2). As a result, the storage areas are not wasted, and the number of lines is reduced from n to (n/2)+1. In this way, a smaller storage area is used for storing the compressed coefficient data.

The storage unit 22 holds a coefficient matrix or compressed coefficient data.

The decoding unit 23 includes a compression determination unit 23a and a matrix decoding unit 23b.

When the flag outputted by the matrix analysis unit 21a is a value indicating compression of the coefficient matrix, the compression determination unit 23a transmits the compressed coefficient data stored in the storage unit 22 to the matrix decoding unit 23b. When the flag is not a value indicating compression of the coefficient matrix, the compression determination unit 23a transmits the coupling coefficients in the uncompressed coefficient matrix stored in the storage unit 22 to the annealing unit 24.

The matrix decoding unit 23b decodes the received compressed coefficient data to obtain the coupling coefficients. For example, when the annealing unit 24 transmits a request for reading the row including the coupling coefficient $W_{i2}$, the matrix decoding unit 23b obtains the coupling coefficients in the row including the coupling coefficient $W_{i2}$ that are not included in the compressed coefficient data by using the coupling coefficients in the column including the coupling coefficient $W_{2i}$ in the compressed coefficient data.

In addition, when the annealing unit 24 transmits a request for reading a coupling coefficient in the diagonal component 15a or the symmetric component 15b arranged in a storage area allocated to the symmetric component 15c, the matrix decoding unit 23b reads the coupling coefficient from the storage unit 22 in accordance with the corresponding memory arrangement rule.

For example, when the annealing unit 24 transmits a request for reading the row including the coupling coefficient $W_{nn}$, the matrix decoding unit 23b reads the coupling coefficient $W_{nn}$ from the storage area L2 in FIG. 3.

The matrix decoding unit 23b may obtain the coupling coefficients in the symmetric component 15c from the coupling coefficients in the symmetric component 15b after reading all the compressed coefficient data, which has been rearranged as illustrated in FIG. 3, from the storage unit 22 and rearranging the read compressed coefficient data to its original memory arrangement.

As is the case with the compression unit 11 or the decoding unit 13 of the optimization apparatus 10 according to the first embodiment, the compression unit 21 or the decoding unit 23 may be realized by, for example, an electronic circuit designed for specific use, such as an ASIC or an FPGA. In addition, the compression unit 21 or the decoding unit 23 may be a processor such as a CPU or a DSP. When the compression unit 21 or the decoding unit 23 is a processor, the corresponding processing described above is realized by causing the processor to execute the corresponding program stored in the storage unit 22, for example.

As is the case with the storage unit 12 of the optimization apparatus 10 according to the first embodiment, the storage unit 22 is, for example, a volatile memory such as an SRAM or a non-volatile memory such as a flash memory or an EEPROM.

The annealing unit 24 performs a simulated annealing operation by using the coupling coefficients in an uncompressed coefficient matrix transmitted from the compression determination unit 23a or the coupling coefficients in a coefficient matrix transmitted from the matrix decoding unit 23b. Since the simulated annealing operation performed by the annealing unit 24 is the same as that performed by the annealing unit 14 of the optimization apparatus 10 according to the first embodiment, description thereof will be omitted.

As is the case with the annealing unit 14 according to the first embodiment, the annealing unit 24 may be realized by, for example, registers or memories holding the coupling coefficients, the bias coefficients, and the individual bit values, product-sum operation circuits, random number generators, logic circuits such as comparators and selectors, and a control circuit.

Next, an example of an operation of the optimization apparatus 20 according to the second embodiment will be described.

Figure 4:
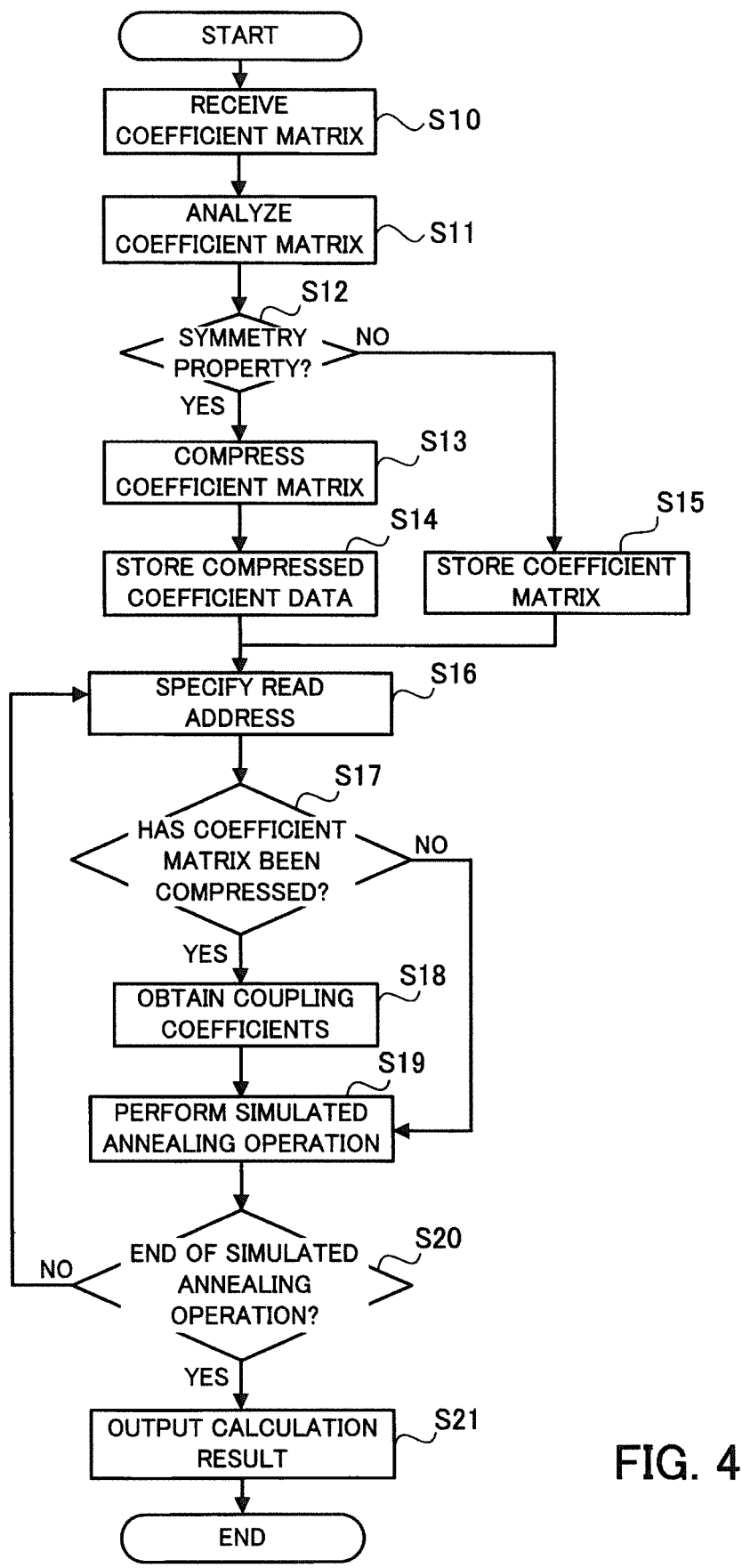
FIG. 4 is a flowchart illustrating an example of an operation of the optimization apparatus according to the second embodiment.

FIG. 4 is a flowchart illustrating an example of an operation of the optimization apparatus 20 according to the second embodiment.

The matrix analysis unit 21a receives a coefficient matrix (step S10), analyzes the received coefficient matrix (step S11), and determines whether the coefficient matrix has a symmetry property (step S12). If the matrix analysis unit 21a determines that the coefficient matrix has a symmetry property, the matrix analysis unit 21a transmits the coefficient matrix to the matrix compression unit 21b, and the matrix compression unit 21b compresses the coefficient matrix on the basis of the symmetry property of the coefficient matrix (step S13) If the matrix analysis unit 21a determines that the coefficient matrix has a symmetry property, the matrix analysis unit 21a transmits a flag indicating compression of the coefficient matrix to the decoding unit 23.

Next, the matrix compression unit 21b stores the compressed coefficient data in the storage unit 22 (step S14).

In contrast, if the matrix analysis unit 21a determines that the coefficient matrix does not have a symmetry property, the matrix analysis unit 21a stores the coefficient matrix in the storage unit 22 (step S15).

After the processing in step S14 or step S15, to acquire the coupling coefficients used in a simulated annealing operation, the annealing unit 24 transmits a request for reading the corresponding coupling coefficients by specifying a read address to the storage unit 22 (step S16). Accordingly, the compressed coefficient data or the coupling coefficients in the uncompressed coefficient matrix corresponding to the read address are read from the storage unit 22.

Next, the compression determination unit 23a determines whether the coefficient matrix is compressed on the basis of whether the flag outputted by the matrix analysis unit 21a is a value indicating compression of the coefficient matrix (step S17).

If the compression determination unit 23a determines that the coefficient matrix is compressed, the compression determination unit 23a transmits the compressed coefficient data to the matrix decoding unit 23b, and the matrix decoding unit 23b decodes the received compressed coefficient data to obtain the coupling coefficients (step S18). The matrix decoding unit 23b transmits the coupling coefficient to the annealing unit 24.

Next, the annealing unit 24 performs a simulated annealing operation by using the received coupling coefficients (step S19). If the compression determination unit 23a determines that the coefficient matrix is not compressed, the compression determination unit 23a transmits the coupling coefficients in the uncompressed coupling matrix read from the storage unit 22 to the annealing unit 24, and the annealing unit 24 performs a simulated annealing operation by using the coupling coefficients.

After the processing in step S19, for example, the control circuit (not illustrated) in the annealing unit 24 determines whether the simulated annealing operation has ended (step S20). For example, if the annealing unit 24 has repeated the above processing the predetermined number of times, the control circuit determines that the simulated annealing operation has ended.

If the control circuit determines that the simulated annealing operation has not ended, the processing returns to step S16. If the control circuit determines that the simulated annealing operation has ended, the annealing unit 24 outputs the values of the individual bits as a solution (a calculation result) to the problem (step S21).

With this optimization apparatus 20 according to the second embodiment, since a coefficient matrix is compressed on the basis of a symmetry property of the coefficient matrix and is stored in the storage unit 22, the storage unit 22 needs a smaller storage capacity, compared with the problem scale. Namely, a large-scale problem is calculated by using a small amount of memory.

For example, when the number of bits of the Ising model is n and when the coefficient matrix is not compressed, the number of coupling coefficients is n×n. However, with the above compression technique, only $n((n/2)+1)$ coupling coefficients are included in the compressed coefficient data. Namely, the compressed coefficient matrix has about 50% of the size of the uncompressed coefficient matrix.

In addition, after analyzing a coefficient matrix, if the matrix analysis unit 21a determines that the coefficient matrix does not have a symmetry property, the matrix analysis unit 21a determines not to compress the coefficient matrix. In this way, the coefficient matrices that do not produce a suitable compression effect are not compressed. In other words, among the coefficient matrices corresponding to various problems, the optimization apparatus 20 selectively compresses those that produce a suitable compression effect (those having a symmetry property in the second embodiment).

If the user knows in advance that the coefficient matrix is a symmetric matrix, the optimization apparatus 20 does not need to include the matrix analysis unit 21a and the compression determination unit 23a. In this case, the processing in steps S11, S12, S15, and S17 illustrated in FIG. 4 does not need to be performed.

Third Embodiment

For example, in a coefficient matrix used in a traveling salesman problem, diagonally arranged coupling coefficients have the same pattern. The following optimization apparatus according to a third embodiment compresses a coefficient matrix by using a pattern property of the coefficient matrix.

Figure 5:
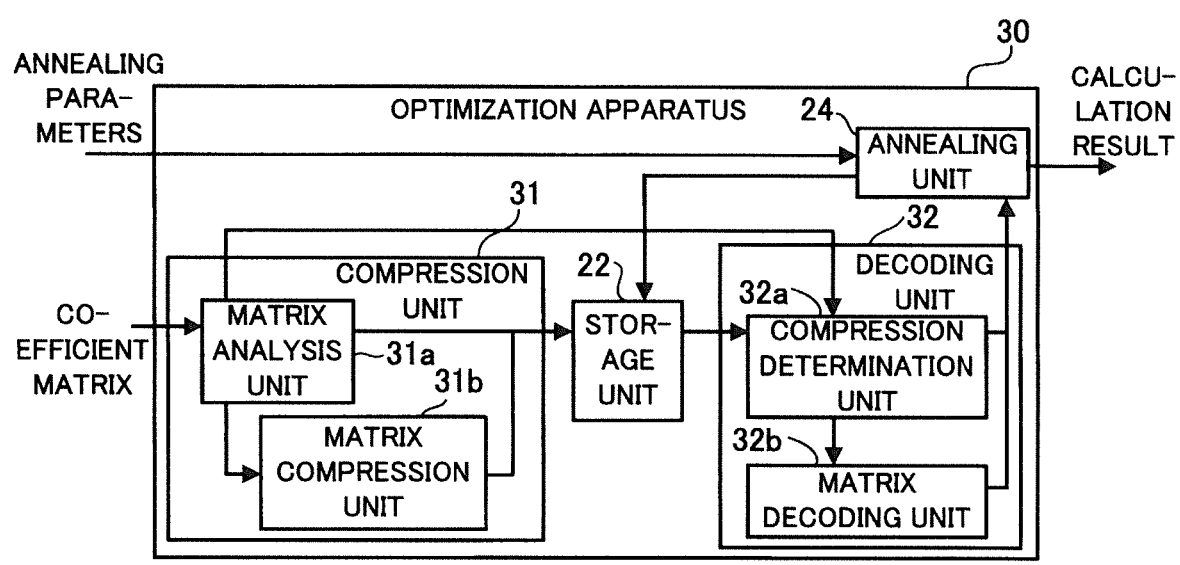
FIG. 5 illustrates an example of an optimization apparatus according to a third embodiment.

FIG. 5 illustrates an example of an optimization apparatus 30 according to a third embodiment. The optimization apparatus 30 illustrated in FIG. 5 includes elements also used in the optimization apparatus 20 according to the second embodiment illustrated in FIG. 2, and these elements will be denoted by like reference characters.

As is the case with the optimization apparatus 20 according to the second embodiment, the optimization apparatus 30 according to the third embodiment includes a compression unit 31 and a decoding unit 32. However, the compression unit 31 has a function of outputting compressed coefficient data in which a coefficient matrix is compressed on the basis of a pattern property of the coefficient matrix, and the decoding unit 32 has a function of decoding the compressed coefficient data to obtain the coupling coefficients.

Figure 6:
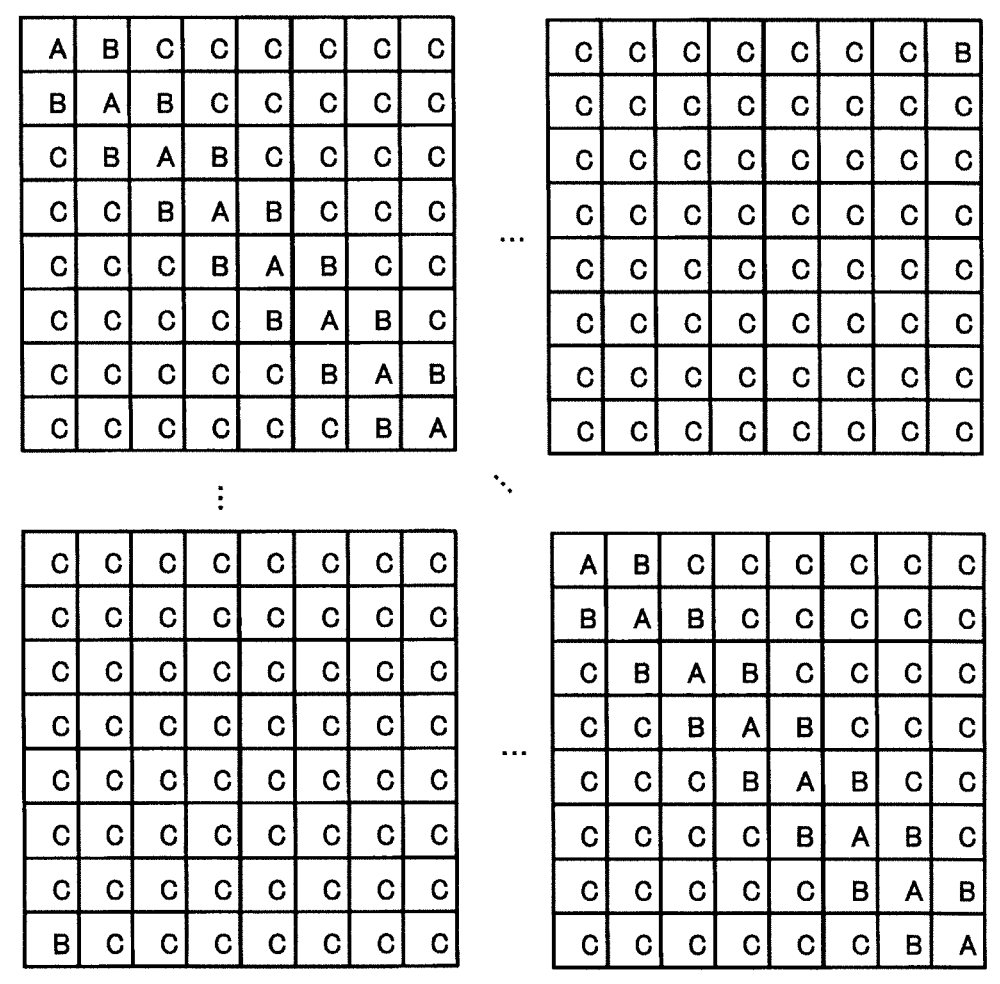

FIG. 6 illustrates an example of a coefficient matrix having a pattern property.

In FIG. 6, each of the blocks denoted by reference characters "A" to "C" (hereinafter referred to as sub-blocks A to C) is a matrix in which m×m (for example, 32×32) coupling coefficients are arranged. All the sub-blocks A are represented by the same matrix. Likewise, all the sub-blocks B are represented by the same matrix, and all the sub-blocks C are represented by the same matrix. In the example in FIG. 6, the entire coefficient matrix (formed by 1,024×1,024 coupling coefficients, for example) is formed by three kinds of sub-blocks A to C.

A matrix analysis unit 31a in the compression unit 31 receives a coefficient matrix, analyzes the received coefficient matrix, and determines whether the coefficient matrix has a pattern property.

For example, first, the matrix analysis unit 31a determines that the m×m coupling coefficients in the top left corner of the coefficient matrix is a sub-block A and detects the same sub-blocks A from the entire coefficient matrix. For example, the matrix analysis unit 31a compares the m×m coupling coefficients in the sub-block A with the m×m coupling coefficients in each of the other blocks from the top left corner to the bottom right corner in the order of raster scanning. If the m×m coupling coefficients in a sub-block match the m×m coupling coefficients in the sub-block A, the matrix analysis unit 31a determines that the m×m coupling coefficients correspond to a sub-block A. The matrix analysis unit 31a performs the same processing on the other sub-blocks B and C. If the entire coefficient matrix is not represented by the three kinds of sub-blocks A to C, the matrix analysis unit 31a increases the number of kinds of sub-blocks and performs the same processing.

If, for example, the entire coefficient matrix is represented by a certain number of kinds of sub-blocks, the certain number being equal to or less than a predetermined threshold (for example, 3), the matrix analysis unit 31a determines that the coefficient matrix has a pattern property. If many kinds of sub-blocks are included in a coefficient matrix, the data amount reduction effect obtained by the following compression is low. Thus, if the entire coefficient matrix is represented by a certain number of kinds of sub-blocks, the number being over the predetermined threshold, the matrix analysis unit 31a determines that the coefficient matrix does not have a pattern property.

If the matrix analysis unit 31a determines that the coefficient matrix has a pattern property, the matrix analysis unit 31a transmits the coefficient matrix to a matrix compression unit 31b. In contrast, if the matrix analysis unit 31a determines that the coefficient matrix does not have a pattern property, the matrix analysis unit 31a stores the coefficient matrix in a storage unit 22. If the matrix analysis unit 31a determines that the coefficient matrix has a pattern property, the matrix analysis unit 31a transmits a flag indicating compression of the coefficient matrix to the decoding unit 32.

The matrix compression unit 31b outputs compressed coefficient data in which the coefficient matrix is compressed on the basis of the pattern property of the coefficient matrix. For example, the matrix compression unit 31b outputs compressed coefficient data including the coupling coefficients included in the sub-blocks A to C and the bit patterns, each of which indicates the sub-block arrangement order in an individual row in the coefficient matrix, and stores the compressed coefficient data in the storage unit 22.

FIG. 7 illustrates an example of compressed coefficient data stored.

The size of the coefficient matrix, the number of kinds of sub-blocks (3 in the example in FIG. 6), etc. are stored in a storage area L1 in the storage unit 22. The coupling coefficients in a sub-block A are stored in a storage area L2, and the coupling coefficients in a sub-block B are stored in a storage area L3. In addition, the coupling coefficients in a sub-block C are stored in a storage area L4. In addition, the bit patterns, each of which indicates the sub-block arrangement order in an individual row in the coefficient matrix, are stored in storage areas L5 to L1028.

For example, when the kinds of sub-blocks are three kinds of sub-blocks A to C, any one of the kinds of the sub-blocks A to C is represented by 2 bits. When the kinds of sub-blocks A to C are represented by 00, 01, and 10, respectively, for example, the arrangement order of sub-blocks A, B, C, C, C, and C is represented by a bit pattern of 00, 01, 10, 10, 10, and 10.

For example, when a coefficient matrix formed by 1,024×1,024 coupling coefficients is represented by 32×32 sub-blocks, since the same bit pattern is used from the first row to the 32nd row in the coefficient matrix, all the bit patterns from the first row to the 1,024th row do not need to be stored in the storage unit 22 as illustrated in FIG. 7.

The decoding unit 32 includes a compression determination unit 32a and a matrix decoding unit 32b.

When the flag outputted by the matrix analysis unit 31a is a value indicating compression of the coefficient matrix, the compression determination unit 32a transmits the compressed coefficient data stored in the storage unit 22 to the matrix decoding unit 32b. When the flag is not a value indicating compression of the coefficient matrix, the compression determination unit 32a transmits the coupling coefficients in the uncompressed coefficient matrix stored in the storage unit 22 to an annealing unit 24.

The matrix decoding unit 32b decodes the received compressed coefficient data to obtain the coupling coefficients. For example, when the annealing unit 24 transmits a request for reading the coupling coefficients corresponding to the i-th bit, the matrix decoding unit 32b obtains the coupling coefficients by using the bit pattern in the i-th row in the coefficient matrix and the coupling coefficients in the sub-blocks arranged in the arrangement order represented by the bit pattern. For example, when the bit pattern in the i-th row indicates the arrangement order of sub-blocks A, B, C, and C, the matrix decoding unit 32b outputs the coupling coefficients in the row corresponding to the i-th row in the coefficient matrix in the sub-blocks A to C as the decoding result in the order of the sub-blocks A, B, C, and C.

As is the case with the compression unit 11 or the decoding unit 13 of the optimization apparatus 10 according to the first embodiment, the compression unit 31 or the decoding unit 32 may be realized by, for example, an electronic circuit designed for specific use, such as an ASIC or an FPGA. In addition, the compression unit 31 or the decoding unit 32 may be a processor such as a CPU or a DSP. When the compression unit 31 or the decoding unit 32 is a processor, the corresponding processing described above is realized by causing the processor to execute the corresponding program stored in the storage unit 22, for example.

Next, an example of an operation of the optimization apparatus 20 according to the third embodiment will be described.

Figure 8:
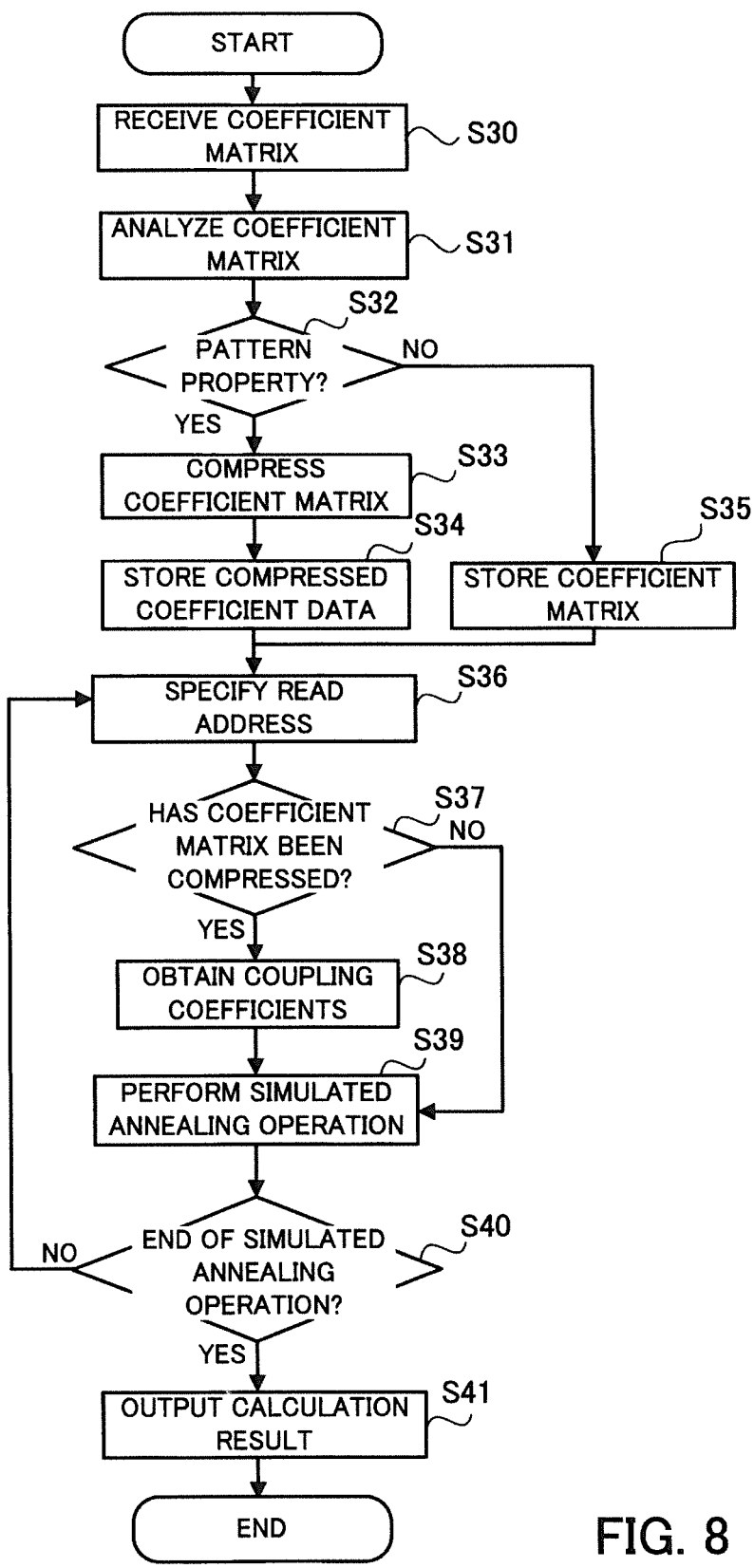
FIG. 8 is a flowchart illustrating an example of an operation of the optimization apparatus according to the third embodiment.

FIG. 8 is a flowchart illustrating an example of an operation of the optimization apparatus 20 according to the third embodiment.

The matrix analysis unit 31a receives a coefficient matrix (step S30), analyzes the received coefficient matrix (step S31), and determines whether the coefficient matrix has a pattern property (step S32). If the matrix analysis unit 31a determines that the coefficient matrix has a pattern property, the matrix analysis unit 31a transmits the coefficient matrix to the matrix compression unit 31b, and the matrix compression unit 31b compresses the coefficient matrix on the basis of the pattern property of the coefficient matrix (step S33). If the matrix analysis unit 31a determines that the coefficient matrix has a pattern property, the matrix analysis unit 31a transmits a flag indicating compression of the coefficient matrix to the decoding unit 32.

The processing in steps S34 to S37 is the same as that in steps S14 to S17 illustrated in FIG. 4.

If the compression determination unit 32a determines that the coefficient matrix is compressed on the basis of a pattern property, the compression determination unit 32a transmits the compressed coefficient data to the matrix decoding unit 32b, and the matrix decoding unit 32b decodes the received compressed coefficient data to obtain the coupling coefficients (step S38). The matrix decoding unit 32b transmits the coupling coefficient to the annealing unit 24.

The following processing in steps S39 to S41 is the same as that in steps S19 to S21 illustrated in FIG. 4.

With this optimization apparatus 30 according to the third embodiment, since a coefficient matrix is compressed on the basis of a pattern property of the coefficient matrix and is stored in the storage unit 22, the storage unit 22 needs a smaller storage capacity, compared with the problem scale. Namely, a large-scale problem is calculated by using a small amount of memory.

For example, in a traveling salesman problem, when the number of cities is set to 32, the number of coupling coefficients is 1,024×1,024. The following description assumes that the entire coefficient matrix is represented by a repetition of three kinds of sub-blocks A to C, each of which is formed by 32×32 coupling coefficients, as illustrated in FIG. 6 and that a single coupling coefficient is represented by 16 bits. Since the entire coefficient matrix is represented by the 32×32 sub-blocks and the three kinds of sub-blocks are represented by 2 bits, the amount of information about the compressed coefficient data (the coupling coefficients of the three kinds of sub-blocks and their bit patterns) is 16×32×32×3+2×32×32=51,200 bits.

In contrast, when the coefficient matrix is not compressed, the amount of information about the coupling coefficients is 16×32×32×32×32=16,777,216 bits. Thus, in this example, the amount of information about the compressed coefficient data is about 0.3% of that of the uncompressed coefficient matrix, and the optimization apparatus 30 according to the third embodiment achieves higher compression effect than that achieved by the optimization apparatus 20 according to the second embodiment.

In reality, more than three kinds of sub-blocks could be used. However, for example, even when 10 kinds of sub-blocks are used, the amount of information about the compressed coefficient data is 16×32×32×10+4×32×32=167,936 bits, and the amount of information about the compressed coefficient data is about 1% of that of the uncompressed coefficient matrix.

In addition, after analyzing a coefficient matrix, if the matrix analysis unit 31a determines that the coefficient matrix does not have a pattern property, the matrix analysis unit 31a determines not to compress the coefficient matrix. In this way, the coefficient matrices that do not produce a suitable compression effect are not compressed. In other words, among the coefficient matrices corresponding to various problems, the optimization apparatus 30 selectively compresses those that produce a suitable compression effect (those having a pattern property in the third embodiment).

Fourth Embodiment

As described above, the annealing parameters used by an annealing unit 24 include bias coefficients. A bias coefficient is set for each bit included in an Ising model and is stored in a register or a memory (not illustrated) in the annealing unit 24. However, if the number of bias coefficients is increased with the number of bits included in an Ising model, the storage capacity of the register or the memory needs to be increased. To solve this problem, an optimization apparatus 40 according to a fourth embodiment has not only a function of compressing the coefficient matrix but also a function of compressing the bias coefficients.

Figure 9:
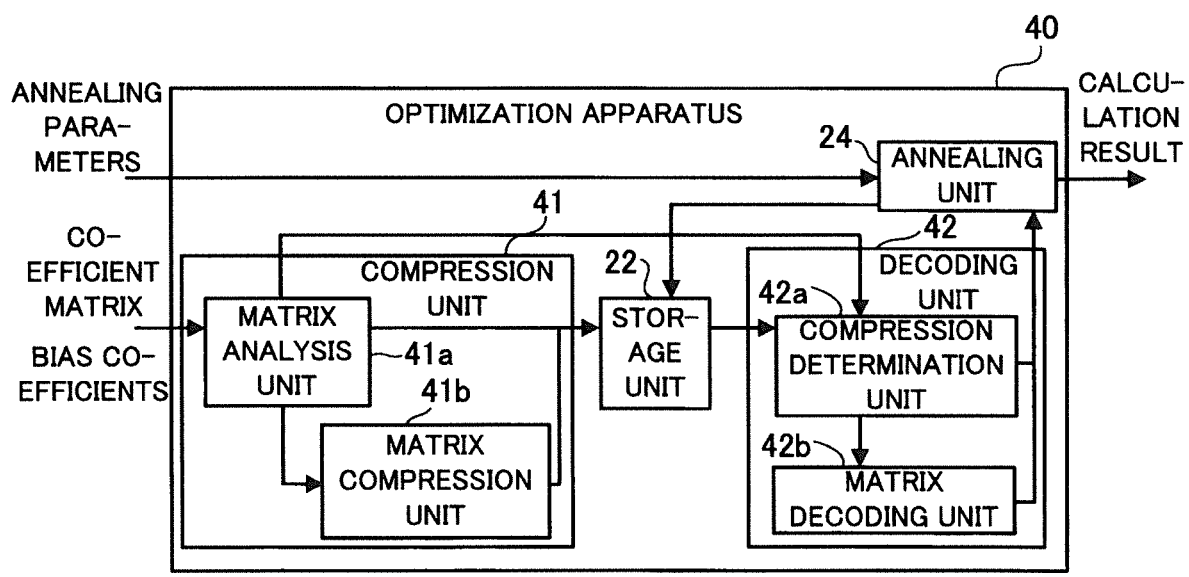
FIG. 9 illustrates an example of an optimization apparatus according to a fourth embodiment.

FIG. 9 illustrates an example of the optimization apparatus 40 according to the fourth embodiment. In FIG. 9, the optimization apparatus 40 illustrated in FIG. 9 includes elements also used in the optimization apparatus 20 according to the second embodiment illustrated in FIG. 2, and these elements will be denoted by like reference characters.

As is the case with the optimization apparatus 20 according to the second embodiment, the optimization apparatus 40 according to the fourth embodiment includes a compression unit 41 and a decoding unit 42. However, the compression unit 41 has not only a function of outputting compressed coefficient data in which a coefficient matrix is compressed on the basis of a symmetry property or a pattern property of the coefficient matrix but also a function of outputting compressed bias coefficient data in which the corresponding bias coefficients are compressed. The decoding unit 42 has not only a function of decoding the compressed coefficient data to obtain the coupling coefficients but also a function of decoding the compressed bias coefficient data to obtain the bias coefficients.

While the bias coefficients given to the bits included in an Ising model vary depending on the calculation target problem, in many cases, many of the bias coefficients indicate the same value. The compression unit 41 compresses the bias coefficients by using this property.

A matrix analysis unit 41a in the compression unit 41 receives a coefficient matrix, analyzes the received coefficient matrix, and determines whether the coefficient matrix has a symmetry property or a pattern property. When the matrix analysis unit 41a receives the bias coefficients of the respective bits, if the number of kinds of the values used as the bias coefficients is equal to or less than a predetermined threshold, the matrix analysis unit 41a determines that the bias coefficients have a pattern property.

For example, when bias coefficients $b_i$ to $b_n$ of n bits are 16301, 6520, 6520, 16301, 16301, 6520, . . . , and 16301, only two kinds of values are used as the bias coefficients $b_1$ to $b_n$. If the predetermined threshold is 2 or more, in this example, the matrix analysis unit 41a determines that the bias coefficients have a pattern property.

If many kinds of values are used as the bias coefficients, the data amount reduction effect obtained by the following compression is low. Thus, if the number of kinds of values used as the bias coefficients is over the predetermined threshold, the matrix analysis unit 41a determines that the bias coefficients do not have a pattern property.

If the matrix analysis unit 41a determines that the coefficient matrix has a symmetry property or a pattern property, the matrix analysis unit 41a transmits the coefficient matrix to a matrix compression unit 41b. In contrast, if the matrix analysis unit 41a determines that the coefficient matrix does not have a symmetry property or a pattern property, the matrix analysis unit 41a stores the coefficient matrix in a storage unit 22. If the matrix analysis unit 41a determines that the coefficient matrix has a symmetry property or a pattern property, the matrix analysis unit 41a transmits a flag indicating compression of the coefficient matrix to the decoding unit 42.

If the matrix analysis unit 41a determines that the bias coefficients have a pattern property, the matrix analysis unit 41a transmits the bias coefficients to the matrix compression unit 41b. In contrast, if the matrix analysis unit 41a determines that the bias coefficients do not have a pattern property, the matrix analysis unit 41a stores the bias coefficients in the storage unit 22. If the matrix analysis unit 41a determines that the bias coefficients have a pattern property, the matrix analysis unit 41a transmits a flag indicating compression of the bias coefficients to the decoding unit 42.

The matrix compression unit 41b outputs compressed coefficient data in which the coefficient matrix is compressed on the basis of the symmetry property or the pattern property of the coefficient matrix and stores the compressed coefficient data in the storage unit 22. In addition, the matrix compression unit 41b outputs compressed bias coefficient data in which the bias coefficients are compressed on the basis of the pattern property of the bias coefficients and stores the compressed bias coefficient data in the storage unit 22.

For example, when two kinds of values are used as the bias coefficients as in the above example, the matrix compression unit 41b outputs compressed coefficient data, which is a bit pattern in which each value is represented by one bit. For example, as described above, the bias coefficients $b_1$ to $b_n$ of n bits are 16301, 6520, 6520, 16301, 16301, 6520, . . . , and 16301, the bit pattern is 0, 1, 0, 0, 1, . . . , and 0. If three or four kinds of values are used as the bias coefficients, each of the values of the bias coefficients is represented by two bits.

The decoding unit 42 includes a compression determination unit 42a and a matrix decoding unit 42b.

If the flag outputted by the matrix analysis unit 41a is a value indicating compression of the coefficient matrix, the compression determination unit 42a transmits the compressed coefficient data stored in the storage unit 22 to the matrix decoding unit 42b. If the flag is not a value indicating compression of the coefficient matrix, the compression determination unit 42a transmits the coupling coefficients in the uncompressed coefficient matrix stored in the storage unit 22 to the annealing unit 24.

In addition, if the flag outputted by the matrix analysis unit 41a is a value indicating compression of the bias coefficients, the compression determination unit 42a transmits the compressed bias coefficient data stored in the storage unit 22 to the matrix decoding unit 42b. If the flag is not a value indicating compression of the bias coefficients, the compression determination unit 42a transmits the uncompressed bias coefficients stored in the storage unit 22 to the annealing unit 24.

The matrix decoding unit 42b decodes the received compressed coefficient data to obtain the coupling coefficients. In addition, the matrix decoding unit 42b decodes the received compressed bias coefficient data to obtain the bias coefficients. For example, when the annealing unit 24 transmits a request for reading the bias coefficient $b_i$ of the i-th bit, the matrix decoding unit 42b obtains the bias coefficient $b_i$ from the i-th value (0 or 1 in the above example) in the above bit pattern. For example, if the i-th value is 0, in the above example, 16301 is the obtained bias coefficient $b_i$.

As is the case with the compression unit 11 or the decoding unit 13 of the optimization apparatus 10 according to the first embodiment, the compression unit 41 or the decoding unit 42 may be realized by, for example, an electronic circuit designed for specific use, such as an ASIC or an FPGA. In addition, the compression unit 41 or the decoding unit 42 may be a processor such as a CPU or a DSP. When the compression unit 41 or the decoding unit 42 is a processor, the corresponding processing described above is realized by causing the processor to execute the corresponding program stored in the storage unit 22, for example.

Next, an example of an operation of the optimization apparatus 40 according to the fourth embodiment will be described.

Figure 10:
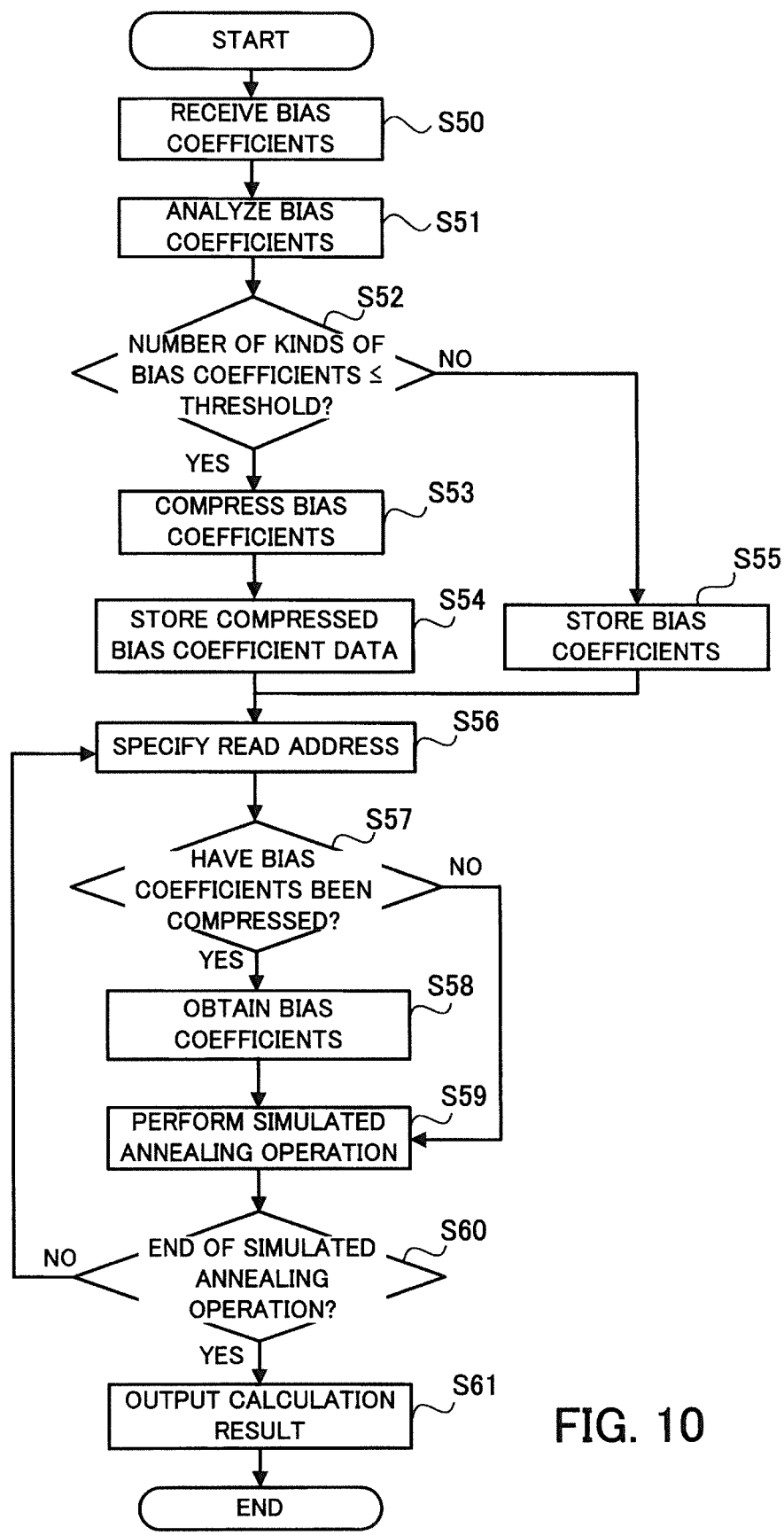
FIG. 10 is a flowchart illustrating an example of an operation of the optimization apparatus according to the fourth embodiment.

FIG. 10 is a flowchart illustrating an example of an operation of the optimization apparatus 40 according to the fourth embodiment.

Since the processing for compressing and obtaining the coefficient matrix is the same as that illustrated in FIG. 4 or 8, description thereof will be omitted.

The matrix analysis unit 41a receives bias coefficients (step S50), analyzes the received bias coefficients (step S51), and determines whether the number of kinds of bias coefficients is equal to or less than a threshold (step S52). If the number of kinds of bias coefficients is equal to or less than the threshold, the matrix analysis unit 41a transmits the bias coefficients to the matrix compression unit 41b. The matrix compression unit 41b compresses the bias coefficients as described above (step S53). If the number of kinds of bias coefficients is equal to or less than the threshold, the matrix analysis unit 41a transmits a flag indicating compression of the bias coefficients to the decoding unit 42.

Next, the matrix compression unit 41b stores the compressed bias coefficient data in the storage unit 22 (step S54).

In contrast, if the number of kinds of bias coefficients is over the threshold, the matrix analysis unit 41*a* stores the bias coefficients in the storage unit 22 (step S55).

After the processing in step S54 or step S55, to acquire the bias coefficients used in a simulated annealing operation, the annealing unit 24 transmits a request for reading the bias coefficients by specifying a read address to the storage unit 22 (step S56). Accordingly, the compressed bias coefficient data or the uncompressed bias coefficients corresponding to the read address are read from the storage unit 22.

Next, the compression determination unit 42*a* determines whether the bias coefficients are compressed on the basis of whether the flag outputted by the matrix analysis unit 41*a* is a value indicating compression of the bias coefficients (step S57).

If the compression determination unit 42*a* determines that the bias coefficients are compressed, the compression determination unit 42*a* transmits the compressed bias coefficient data to the matrix decoding unit 42*b*, and the matrix decoding unit 42*b* decodes the received compressed bias coefficient data to obtain the bias coefficients (step S58). The matrix decoding unit 42*b* transmits the bias coefficients to the annealing unit 24.

Next, the annealing unit 24 performs a simulated annealing operation by using the received bias coefficients (and the coupling coefficients received in the processing illustrated in FIG. 4 or 8) (step S59). If the compression determination unit 42*a* determines that the bias coefficients are not compressed, the compression determination unit 42*a* transmits the uncompressed bias coefficients read from the storage unit 22 to the annealing unit 24, and the annealing unit 24 performs a simulated annealing operation by using the received bias coefficients.

After the processing in step S59, for example, a control circuit (not illustrated) in the annealing unit 24 determines whether the simulated annealing operation has ended (step S60). For example, if the annealing unit 24 has repeated the above processing the predetermined number of times, the control circuit determines that the simulated annealing operation has ended.

If the control circuit determines that the simulated annealing operation has not ended, the processing returns to step S56. If the control circuit determines that the simulated annealing operation has ended, the annealing unit 24 outputs the values of the individual bits as a solution (a calculation result) to the problem (step S61).

With this optimization apparatus 40 according to the fourth embodiment, the matrix compression unit 41*b* compresses not only a coefficient matrix but also the corresponding bias coefficients and stores the compressed data in the storage unit 22. In this way, a register or a memory (not illustrated) in the annealing unit 24 of the optimization apparatus 40 needs a smaller storage capacity.

While aspects of the optimization apparatuses and control methods thereof based on embodiments have been described, the above description is only an example. The embodiments are not limited to the above description.

In an aspect, the embodiments enable calculation of a large-scale problem by using a small amount of memory.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An optimization apparatus comprising:
a compression unit configured to
receive a coefficient matrix including coupling coefficients, each of which indicates a coupling strength between bits of an Ising model,
determine, based on the coefficient matrix, whether the coefficient matrix has a symmetry property or a pattern property,
create first data which is compressed data of the coefficient matrix by reducing a data amount of the coefficient matrix based on the symmetry property or the pattern property of the coefficient matrix when the coefficient matrix is determined to have the symmetry property or the pattern property, and
output the first data;
a storage unit configured to hold the first data outputted by the compression unit;
a decoding unit configured to create the coupling coefficients based on the first data stored in the storage unit; and
an annealing unit configured to perform a simulated annealing operation by using the coupling coefficients created by the decoding unit.

2. The optimization apparatus according to claim 1,
wherein the coefficient matrix is a symmetric matrix and includes a diagonal component, a first symmetric component, and a second symmetric component,
wherein the compression unit creates the first data that includes the diagonal component and one of the first symmetric component and the second symmetric component in the coefficient matrix,
wherein the decoding unit creates the other one of the first symmetric component and the second symmetric component based on the first data stored in the storage unit, and
wherein the annealing unit performs the simulated annealing operation by using the diagonal component, the one of the first symmetric component and the second symmetric component included in the first data, and the other one of the first symmetric component and the second symmetric component created by the decoding unit.

3. The optimization apparatus according to claim 2, wherein the compression unit stores at least a part of the coupling coefficients in the diagonal component and the one of the first symmetric component and the second symmetric component included in the first data in a storage area of the storage unit, the storage area being allocated to the other one of the first symmetric component and the second symmetric component that is not included in the first data.

4. The optimization apparatus according to claim 1, wherein, the compression unit determines whether the coefficient matrix has a symmetry property and stores, when the coefficient matrix does not have a symmetry property, the coefficient matrix in the storage unit without creating the first data.

5. The optimization apparatus according to claim 1, wherein, when the coefficient matrix is formed by a plurality of kinds of sub-blocks, the plurality of kinds indicating respective matrices, the compression unit creates the first data including information indicating the sub-blocks of the plurality of kinds and information indicating an arrangement order of the plurality of sub-blocks.

6. The optimization apparatus according to claim 5, wherein, when a number of the plurality of kinds of sub-blocks is over a predetermined threshold, the compression unit stores the coefficient matrix in the storage unit without creating the first data.

7. The optimization apparatus according to claim 1,
wherein, when a plurality of kinds of values are used as bias coefficients set in the bits in the simulated annealing operation and when a number of the plurality of kinds of values used as the bias coefficients is equal to or less than a threshold, the compression unit outputs compressed bias coefficient data in which the bias coefficients are represented by information indicating the plurality of kinds of values used as the bias coefficients,
wherein the storage unit holds the compressed bias coefficient data outputted by the compression unit,
wherein the decoding unit decodes the compressed bias coefficient data stored in the storage unit to obtain the bias coefficients, and
wherein the annealing unit performs the simulated annealing operation by using the bias coefficients obtained by the decoding unit.

8. A control method of an optimization apparatus, the control method comprising:
receiving, by a compression unit included in the optimization apparatus, a coefficient matrix including coupling coefficients, each of which indicates a coupling strength between bits of an Ising model;
determining, by the compression unit, based on the coefficient matrix, whether the coefficient matrix has a symmetry property or a pattern property,
creating, by the compression unit, first data which is compressed data of the coefficient matrix by reducing a data amount of the coefficient matrix based on the symmetry property or the pattern property of the coefficient matrix when the coefficient matrix is determined to have the symmetry property or the pattern property;
outputting, by the compression unit, the first data;
holding, by a storage unit included in the optimization apparatus, the first data outputted by the compression unit;
creating, by a decoding unit included in the optimization apparatus, the coupling coefficients based on the first data stored in the storage unit; and
performing, by an annealing unit included in the optimization apparatus, a simulated annealing operation by using the coupling coefficients created by the decoding unit.

9. The optimization apparatus according to claim 1, wherein the optimization apparatus is configured to be coupled to a memory device, and the compression unit is configured to receive the coefficient matrix from the memory device having a first storage capacity larger than a second storage capacity of the storage unit.

10. An optimization apparatus comprising:
a compression unit configured to
receive a coefficient matrix including coupling coefficients, each of which indicates a coupling strength between bits of an Ising model,
determine, based on the coefficient matrix, whether the coefficient matrix has a symmetry property or a pattern property,
create first data which is compressed data of the coefficient matrix by reducing a data amount of the coefficient matrix based on the symmetry property or the pattern property of the coefficient matrix when the coefficient matrix is determined to have the symmetry property or the pattern property, and
output the first data;
a storage unit configured to hold the first data outputted by the compression unit;
a decoding unit configured to create the coupling coefficients based on the first data stored in the storage unit; and
an annealing unit configured to perform a simulated annealing operation by using the coupling coefficients created by the decoding unit,
wherein the coefficient matrix is determined to have the symmetric property when the coefficient matrix is a symmetric matrix which includes a diagonal component, a first symmetric component, and a second symmetric component, and
wherein the compression unit creates the first data by removing the first symmetric component from the coefficient matrix.

* * * * *